Sept. 21, 1926.
F. KRAEMER
THERMOSTATIC CONTROL
Filed Oct. 21, 1924
1,600,342
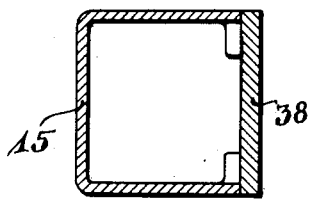
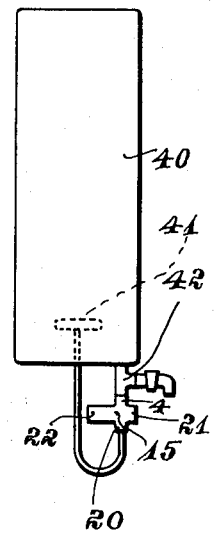
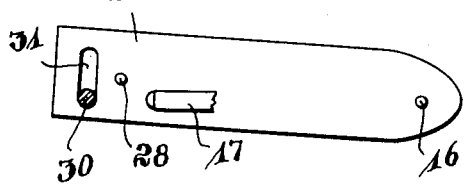
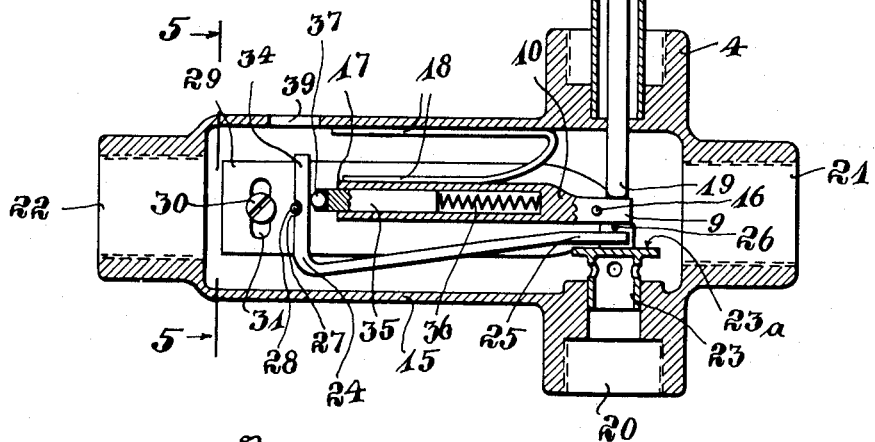
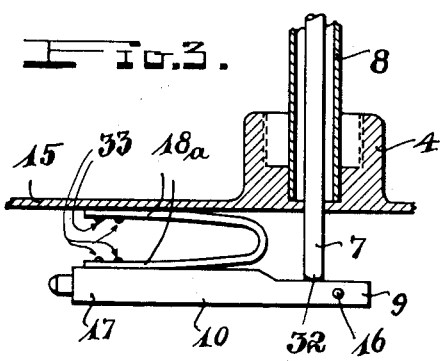
INVENTOR:
FRANK KRAEMER,
By: Otto H. Krueger,
his Atty.

Patented Sept. 21, 1926.

1,600,342

UNITED STATES PATENT OFFICE.

FRANK KRAEMER, OF LOS ANGELES, CALIFORNIA, ASSIGNOR TO JOHN L. COMEY, OF LOS ANGELES, CALIFORNIA.

THERMOSTATIC CONTROL.

Application filed October 21, 1924. Serial No. 744,914.

This invention relates to devices used in connection with so-called storage tanks for thermostatically or automatically maintaining the water in the storage tank at a predetermined or desired temperature.

One of the objects of this invention is to provide a device that can be applied to any common storage tank in connection with a burner or other heating element, having one portion to be inserted into the water compartment of the storage tank and having another portion to be inserted into the structure of the heating element.

Another object is to provide a simple structure of this type that can be applied by any unskilled person, having adjusting means by which the thermostatic control of such a device can be adjusted according to requirements in any storage tank.

Another object is to provide a thermostatic element that can be applied to the drain connection or outlet of a storage tank.

Another object is to provide a device of this type with adjusting means by which the thermostatic elements may be timed according to the temperature desired of the water in the storage tank.

Other objects will appear from the following description and appended claims as well as from the accompanying drawing, in which—

Fig. 1 is a fragmentary longitudinal mid-sectional view of a device of a simple form embodying the invention.

Fig. 2 is a fragmentary detail diagrammatic illustration of the outside adjusting means of the device illustrated in Fig. 1.

Fig. 3 is a fragmentary front elevation of parts arranged for reversing the action with reference to the illustration in Fig. 1, being a slightly modified form of Fig. 1.

Fig. 4 is a diagrammatic outline of a storage tank illustrating the position of the device shown in Fig. 1 with reference to the drain connection and the burner.

Fig. 5 is a cross-section on line 5—5 of Fig. 1.

So-called storage tanks of a form that is, for instance, desired in house-holds for heating water, have commonly plain gas burners embodied in the structure of such storage tanks, reference here being had especially to, we may say, the old style storage tanks where the gas burner must be lit every time that the water in the storage tank is to be heated.

This type of storage tanks is commonly provided with a gas burner of a very plain type without any automatic function.

Such a storage tank is also commonly provided with a drain connection or outlet.

It is one of the principal features of this invention to provide such a device that may be applied to this type of storage tanks without having to materially change any of the main parts of such a storage tank.

It has been found that the simplest way of applying an automatic or thermostatic control to such a common storage tank is by applying the control between the drain connection and the common burner.

As illustrated in the drawing, the device is provided with a connection end 4 to be applied to the drain connection of any common storage tank.

A thermostatic element is provided to be inserted through the drain connection into the inside of the storage tank. The thermostatic element consists mainly of two members of different materials, especially of members having different coefficients of expansion. The different materials may be such as aluminum or hard rubber on the one side and steel on the other side. Of course, any other thermostatic elements may be applied to the general structure of this invention within the scope of the claims.

In the drawing in Fig. 1, the tubular member 5 may be of more expansile material, while the inner rod-like member 6 may be of less expansile material. In the slightly modified form illustrated in Fig. 3, the inner member 7 may be made of more expansile material, while the outer member 8 may be of less expansile material, thereby giving the same action as with the form illustrated in Fig. 1, as will be described more fully hereafter.

In the form illustrated in Fig. 1, the inner thermostatic member 6 is set and adjusted to normally rest on the end 9 of the actuating member 10.

Such a setting and adjusting of the inner member 6 is preferably of a predetermined nature according to the temperature desired of the water in any common storage tank to which this device is applied. The upper end 11 of the member 6 is therefore shown threaded within the upper end 12 of the outer thermostatic member 5. The inner member 6 may be turned and thereby adjusted in relation to the outer member by applying a screw-driver to the notch 13 in the upper end of the member 6. A lock-nut 14 is provided for locking and maintaining the inner member 6 in such a set and adjusted position in relation to the outer member 5 after once having been installed in a storage tank.

After having been installed, further adjustments of the thermostatic control may be made by other members outside of the drain connection. The device is therefore provided with a housing 15 to contain or inclose such other adjusting and operating mechanism.

The actuating member 10 is pivotally mounted as indicated at 16 so that a pressing of the thermostatic member 6 on the end 9 tends to tilt the free end 17 of the actuating member 10 in an upward direction. A spring 18 is inserted between the housing and the free end of the actuating member to counteract the upward movement of the free end 17 of the actuating member 10.

The greater expansile action or function of the outer member 5 in relation to the less expansile action or function of the inner member 6 tends to lift the lower end 19 of the inner thermostatic member from its normal resting place on the end 9 of the actuating member 10, thereby freeing the actuating member 10 to move downwardly with its free end under the pressure of the spring 18.

Gas connections are provided on the housing so that gas may pass through the housing to the outlet connection 20 from either the inlet connection 21 or another inlet connection 22. One of the inlet connections 21 or 22 may be plugged to suit the conditions of a storage tank. The outlet connection 20 is controlled by a valve 23. An operating lever 24 is extended with one end 25 to the valve 23. The end 25 of the lever 24 is in somewhat spaced engagement with the valve 23 to allow the lever 25 to move in either direction to some extent before actuating the valve 23. In the drawing this spaced relation between the lever-end 25 and the valve 23 is accomplished by having a proportionally larger space between a pin 26 and the top 23$_a$ of the valve 23.

The operating lever must tilt easily. To accomplish an easy tilting of the lever, the notch 27 is shown in the drawing to rest on a pin 28. The notch 27 may be suitably larger than the pin to allow a somewhat rolling action on the pin, or the pin may be even provided with a somewhat sharp edge, as commonly used in scales, on which the tilting lever may rest. Such a slight modification is not illustrated and it is believed that it will be understood without further illustration since so commonly known.

As illustrated in Fig. 1, the free end 17 of the actuating member 10 is shown in a position relatively above the tilting point of the lever 24 in relation to the pin 28. In this position the lever is naturally tilted so as to lift the valve 23 to open position in relation to the gas outlet 20, as illustrated in Fig. 1.

An expanding of the thermostatic members 5 and 6, resulting in the less expansile action of the member 6, causes the free end 17 of the actuating member 10 to move to a point below the tilting point of the lever 24 in relation to the pin 28, in the manner described above, thereby causing a tilting of the lever 24 so as to force the end 25 downwardly.

A heating of the thermostatic members 5 and 6, therefore, causes a closing of the gas passage controlled by the valve 23.

After having applied the thermostat with the housing to the drain connection of a water heater, so that further adjustment of the thermostat is made difficult, a further adjustment can be made by the swingable mounting plate 29 in the housing 15.

The mounting plate 29 is illustrated in detail in Fig. 2. This mounting plate is swingably mounted on a pin 16, which forms at the same time the pivot for the actuating member 10. A set screw 30 is provided for maintaining the mounting plate 29 in an adjusted position. The mounting plate is provided with a slot 31 so that the mounting plate can swing to a limited extent in relation to the set screw 30.

As illustrated in Fig. 2, it must be noted that the pin 28 is in a position above the free end 17 roughly outlined in relation to the mounting plate. From this illustration it will be understood that by an adjustment of the mounting plate in relation to the set screw 30 the actuating member 10 can be caused to act on the lever 24 so as to close the gas passage sooner or later according to the adjustment on either setting or adjusting the mounting plate up or down in relation to the set screw 30.

A slightly modified form of the arrangement between the actuating member and the thermostatic members is illustrated in Fig. 3. This is practically a reversal of the arrangement illustrated in Fig. 1. In case the inner thermostatic member 7 is of more expansile material than the outer thermostatic member 8, the inner member naturally expands more than the outer member. To apply this action to the actuating member, if the other arrangements are to be maintained, as illustrated in Fig. 1, it requires an applying of the inner thermostatic member 7 on the other side of the pivot 16, as indicated at 32, instead of being applied to the outer extension end 9, as illustrated in Fig. 1.

An expansion of the thermostatic members results in a downward moving of the free end 17 of the actuating member 10 in a similar manner as described above in relation to the arrangement illustrated in Fig. 1.

A cooling off of the thermostatic members 7 and 8 results in a lifting of the member 7. To return the free end 17 of the actuating member to its normal or uppermost position, the spring 18, must in this case be secured by rivets or otherwise, as indicated at 33, to the housing and to the free end 17.

Such slight modifications, of course, are immaterial and can easily be made without material changes of the structure.

The free end 17 of the actuating member 10 acts upon the lever 24 in moving up and down. The actuating member 10 is made to press upon the upright portion 34 of the lever 24. A plunger 35 is disposed in the free end 17, having a spring 36 embodied in the actuating member 10 to act upon the plunger.

The actual action of the plunger 35 within the actuating member 10 causes a pressing or action upon the upright portion 34 of the lever 24.

From the illustrations in Figs. 1 and 2, it must be clear that the actuating member 10 in its upper-most position will act upon the upright portion 34 of the lever 24 at a point above the pivot 28, while the same actuating member, when moved to its lowermost position, or by a setting of the mounting plate 29, as illustrated in Fig. 2, must act upon the upright portion 34 of the lever 24 at a point below the pivot 28.

In its upper-most position, being at a point above the pivot 28, the actuating member 10, by the plunger action, causes a lifting of the valve 23 through its lever end 25. In its lower-most position, being at a point below the pivot 28, the actuating member 10 causes a closing or pressing down of the valve 23, as will easily be understood from the above description.

Since the actuating member moves thus up and down under the pressure of the spring 36 along the upright portion 34 of the lever 24, there is a certain amount of friction between the actuating member 10 and the upright portion 34 of the lever 24. To reduce this friction between these two members to a minimum, a ball 37 is inserted into the free end of the plunger 35.

The play between the lever end 25 and the valve 23 is made for a special purpose, that is to allow a movement of the lever 24 to some extent before acting on the valve so as to cause a quick closing and opening of the valve, as the lever actually comes into engagement with the pin 26 or the top 23ₐ.

The housing 15 is closed by a cover-plate 38, as illustrated in cross-section in Fig. 5, so that the adjusting mechanism within the housing 15 may easily be reached after the device has been applied to a storage tank or has been inserted in its proper place wherever it is needed.

Where pilot lights are required or are necessary, a suitable opening is provided in the housing, as indicated at 39 in Fig. 1. A simple suggestion of arranging the device on a plain storage tank is illustrated in Fig. 4, the storage tank being indicated at 40, a burner being indicated at 41, and the housing 15 being shown inserted between the drain connection 42 and the burner 41.

Having thus described my invention, I claim:—

1. In a thermostatic control, a mounting plate having a pivot around which the plate can swing at one end and having another pivot near the opposite swingable end for supporting a co-operating member, the plate being provided with an arched slot curved around the axis of the first-named pivot by which the plate and thereby the second-named pivot may be set to different positions in relation to the first named pivot.

2. In a thermostatic control, an actuating member having a pivot near one end and carrying a plunger for axial movement in the opposite end.

3. In a thermostatic control, an actuating member having a pivot near one end and carrying a plunger for axial movement in the opposite end, and a spring inserted in the actuating member to force the plunger outwardly in axial direction.

4. In a thermostatic control, a mounting plate having a pivot around which the plate can swing at one end and having another pivot near the opposite swingable end with its axis parallel to the axis of the first-named pivot, the plate being provided with a slot arched around the first-named pivot for setting and holding the swingable end of the plate in different positions.

5. In a thermostatic control, a housing having a gas passage therethrough, a valve disposed in the housing for controlling the gas passage, thermostatic elements, a mounting plate in the housing having a pivot around which the plate can swing at one end and having another pivot near the opposite swinging end, a lever mechanism disposed between the said valve and the second-named pivot, and an actuating member disposed between the thermostatic elements and the lever-mechanism being pivotally mounted on the said first-named pivot at one end and contacting with its other end on the lever-mechanism adapted to move to opposite sides of the second-named pivot thereby actuating the lever-mechanism with the valve.

6. In a thermostatic control, a housing having a gas passage therethrough, a valve disposed in the housing for controlling the passage, thermostatic elements, a mounting plate swingably mounted in the housing, means for locking the plate against swinging movements in certain positions, a lever pivotally mounted near the swingable end of the plate having an extension end for controlling the said valve, and means operative by the thermostatic elements pivotally mounted at one end and carrying an axially moving plunger in the opposite end disposed to actuate the said lever by contacting with opposite sides of the pivotally mounted lever.

7. In a thermostatic control, a housing having a gas passage therethrough, a valve disposed in the housing for controlling the passage, thermostatic elements, a mounting plate pivotally mounted at one end and carrying a second pivot at the opposite swinging end of the plate, means for locking the plate against swinging movements in certain positions, a lever pivotally mounted on the second-named pivot of the plate in operative connection with the said valve and having portions extending to opposite sides of its supporting pivot transversely to the first-named pivot, and an actuating member pivotally mounted on the first-named pivot having axially moving means to contact with and thereby actuate the oppositely extending portions of the said lever disposed to be actuated by the thermostatic elements.

In testimony that I claim the foregoing as my invention I have signed my name.

FRANK KRAEMER.